United States Patent
Holder et al.

(10) Patent No.: US 8,960,783 B2
(45) Date of Patent: Feb. 24, 2015

(54) RECLINER MECHANISM ACTUATOR

(75) Inventors: Brian S. Holder, Livonia, MI (US); Kurt A. Seibold, Whitmore Lake, MI (US); Michael B. Clor, Commerce Township, MI (US); Aleksandar D. Malusev, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 756 days.

(21) Appl. No.: 13/120,787

(22) PCT Filed: Oct. 2, 2009

(86) PCT No.: PCT/US2009/059407
§ 371 (c)(1),
(2), (4) Date: May 10, 2011

(87) PCT Pub. No.: WO2010/040072
PCT Pub. Date: Apr. 8, 2010

(65) Prior Publication Data
US 2011/0204692 A1    Aug. 25, 2011

Related U.S. Application Data

(60) Provisional application No. 61/102,572, filed on Oct. 3, 2008.

(51) Int. Cl.
*B60N 2/32*    (2006.01)
*B60N 2/30*    (2006.01)

(52) U.S. Cl.
CPC .............. *B60N 2/3011* (2013.01); *B60N 2/305* (2013.01); *B60N 2/3079* (2013.01)
USPC ........................ 297/15; 296/65.09; 296/65.17

(58) Field of Classification Search
None
See application file for complete search history.

(56) References Cited

U.S. PATENT DOCUMENTS

| | | | | |
|---|---|---|---|---|
| 4,484,776 A | * | 11/1984 | Gokimoto et al. | 296/65.09 |
| 5,700,055 A | | 12/1997 | Davidson et al. | |
| 6,139,104 A | | 10/2000 | Brewer | |
| 6,199,951 B1 | * | 3/2001 | Zeile et al. | 297/341 |
| 7,063,368 B2 | | 6/2006 | Kayumi | |
| 7,108,306 B2 | | 9/2006 | Suda et al. | |
| 7,252,320 B2 | * | 8/2007 | Tsujibayashi et al. | 296/65.09 |
| 7,328,929 B2 | * | 2/2008 | Epaud | 296/65.09 |
| 8,123,272 B2 | * | 2/2012 | Ito et al. | 296/65.09 |
| 8,287,037 B2 | * | 10/2012 | Sayama | 297/15 |

(Continued)

OTHER PUBLICATIONS

Form PCT/ISA/210 International Search Report, Application No. PCT/US 09/59407, dated: Dec. 7, 2009.

*Primary Examiner* — David E Allred
(74) *Attorney, Agent, or Firm* — Butzel Long

(57) ABSTRACT

A recliner mechanism for use in a seat assembly of a vehicle, the recliner mechanism comprising a cam stop member coupled to the seat assembly; a cam bracket pivotably coupled to the seat assembly; a catch lever pivotably coupled to the seat assembly; a release crank member coupled to the catch lever; a cable member coupled to the cam bracket and to the cushion pivot bracket; and wherein rotation of the seat assembly via the cushion pivot bracket causes the cable to wind about the cam of the cushion pivot bracket such that the first end of the cable member pulls an actuates the cam bracket causing the cam bracket to rotate against the pin catch lever causing the catch lever to actuate the release crank member to release the recliner mechanism and thereby enable reconfiguration of the seat assembly from a first position to a second position.

9 Claims, 14 Drawing Sheets

(56) References Cited

U.S. PATENT DOCUMENTS

| | | | |
|---|---|---|---|
| 8,297,678 B2 * | 10/2012 | Nakao et al. | 296/65.09 |
| 8,845,026 B2 * | 9/2014 | Kobayashi et al. | 297/324 |
| 2005/0184549 A1 * | 8/2005 | Robinson et al. | 296/65.03 |
| 2009/0295185 A1 * | 12/2009 | Abe et al. | 296/65.09 |
| 2014/0306479 A1 * | 10/2014 | Abe et al. | 296/65.09 |

* cited by examiner

RECLINER MECHANISM ACTUATOR

This application claims the benefit of and priority to U.S. Provisional Patent Application No. 61/102,572, filed Oct. 3, 2008, titled: RECLINER MECHANISM ACTUATOR, in the name of Holder et al. which is incorporated by reference herein.

BACKGROUND

The present disclosure generally relates to the field of vehicle seats. More specifically, the present disclosure relates to an actuator and release of a secondary mechanism via a recliner mechanism for use in a vehicle seat.

It is generally known to provide vehicle seat assemblies that may be flattened, folded, stowed, tumbled, and/or collapsed to increase the vehicle's cargo space, to utilize the seat as a load floor, to enhance the vehicle's utility, to facilitate entry into and exit from the vehicle, and/or to otherwise attempt to meet the ever increasing and changing needs and desires of the vehicle user. It is also generally known to use a recliner mechanism in a vehicle seat to allow a seat occupant to adjust the position of the seat back with respect to the seat base. Such known recliner mechanisms may typically be actuated by the seat occupant to selectively adjust the angular, comfort position of the seat back with respect to the seat base.

There remains a significant and continuing need to provide improved actuation and control of a recliner mechanism to make a vehicle seat simpler to operate and adjust, less costly to manufacture and provides greater function including when adjusting a seat assembly between different positions.

SUMMARY

A recliner mechanism for use in a seat assembly of a vehicle, the recliner mechanism comprising a cam bracket pivotably coupled to the seat assembly, the cam bracket having a first end, a second end, and a biasing member, wherein the biasing member prevents the cam bracket from rotating in a clockwise direction beyond a predetermined position; a catch lever pivotably coupled to the seat assembly, the catch lever having a pin catch lever member in operable engagement with the second end of the cam bracket; a release crank member coupled to the catch lever, the release crank member having a first end and a second end and operable to release the recliner mechanism; and a cable member coupled to the cam bracket, wherein movement of the seat assembly from a first position to a second position pulls the cable member thereby releasing the recliner mechanism.

A vehicle seat assembly for use in a vehicle, the vehicle seat assembly comprising a seat base pivotably coupled to a seat back frame having a first and second side frame member, the first and second side frame member positioned parallel to one another; a recliner mechanism comprising: a cam stop member coupled to the first side frame member; a cam bracket pivotably coupled to the first side frame member, the cam bracket having a first end, a second end, and an extending member, wherein the cam bracket is biased toward the cam stop member such that the extending member engages the cam stop member to prevent the cam bracket from rotating in a clockwise direction beyond a predetermined position; a catch lever pivotably coupled to the first side frame member, the catch lever having a pin catch lever member in operable engagement with the second end of the cam bracket; a release crank member coupled to the catch lever, the release crank member having a first end and a second end; a cushion pivot bracket including a cam, an upper bracket having a first and second end and a lower bracket having a first and second end, wherein the first end of the upper bracket is pivotably coupled to the first end of the lower bracket, the second end of the upper bracket is coupled to the seat base, and the second end of the lower bracket is coupled to the vehicle; a cable member having a first end and a second end, wherein the first end is coupled to the cam bracket and the second end coupled to the cushion pivot bracket; and wherein rotation of the seat base via the cushion pivot bracket causes the cable to wind about the cam of the cushion pivot bracket such that the first end of the cable member pulls an actuates the cam bracket causing the cam bracket to rotate against the pin catch lever causing the catch lever to actuate the release crank member which releases the recliner mechanism and thereby enables reconfiguration of the vehicle seat assembly from a first position to a second position. The recliner mechanism further comprises a recliner mechanism actuator that enables a single handle actuation to release the recliner mechanism and seat assembly to thereby enable reconfiguration of the seat assembly from the first position to the second position.

DETAILED DESCRIPTION

Figure 1:
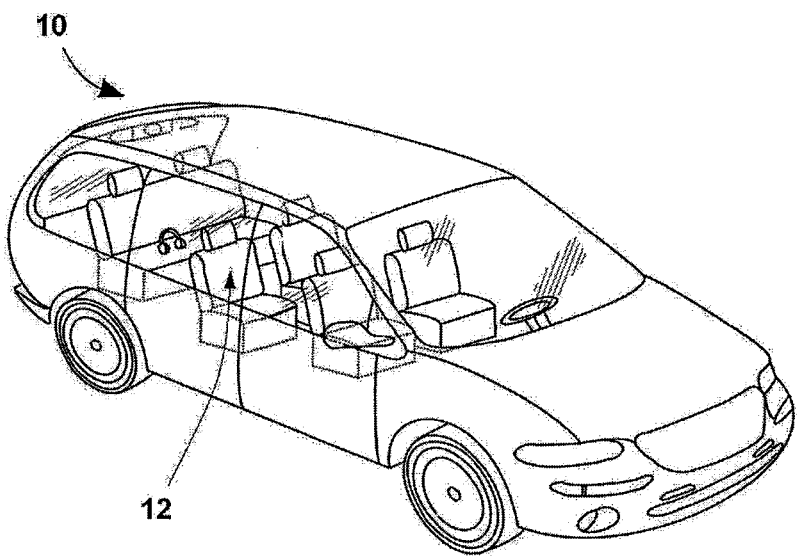
FIG. 1 is a perspective view of a vehicle having a seat assembly, according to an exemplary embodiment.
Figure 2:
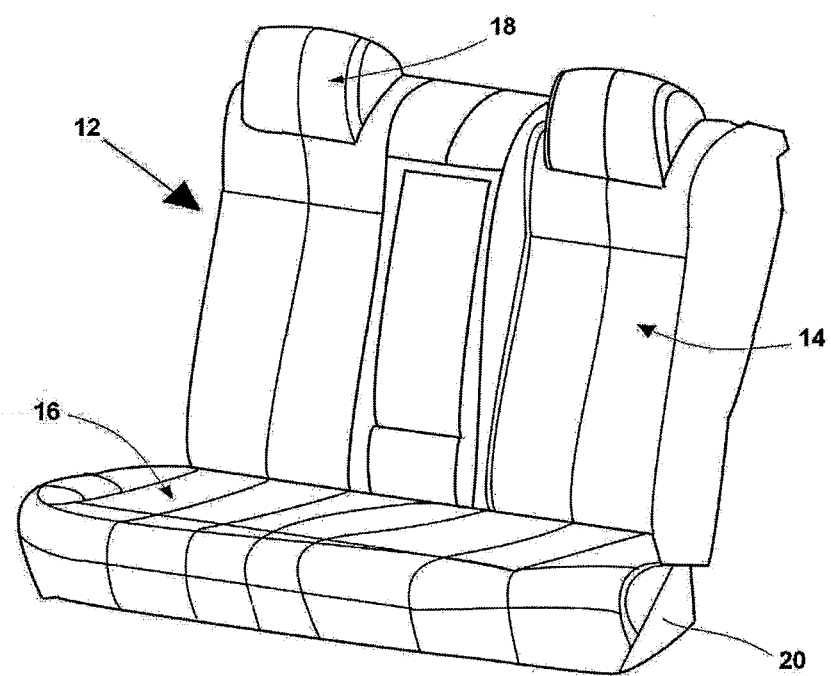
FIG. 2 is a perspective view of a seat assembly, according to an exemplary embodiment.

Referring generally to the figures and in particular to FIG. 1, a vehicle 10 is shown according an exemplary embodiment. The vehicle 10 includes one or more vehicle seats 12 provided for an occupant of the vehicle 10. While the vehicle 10 shown is a mini-van, it should be understood that the vehicle seat 12 of the present disclosure may be used in a mini-van, sport or cross-over utility vehicle or in any other type of vehicle in or by which someone travels or something is carried or conveyed for any market or application including everything from office seating and transportation to planes and space travel. The vehicle seat 12 shown includes a seat back 14 and a seat base (cushion) 16. One exemplary embodiment of a vehicle seat 12 is shown in FIG. 2. The vehicle seat 12 may also include a head restraint 18 and a seat base or portion 20 as well as a recliner mechanism 22. The head restraints 18 shown are an upward extension of the seat back 14 but may otherwise be separately coupled or connected provided they are configured to appropriately function. The seat base 20 may be configured to allow the seat 12 to be selectively adjusted (such as by a manually or motor-driven actuator) relative to the vehicle interior 26.

Figure 3:
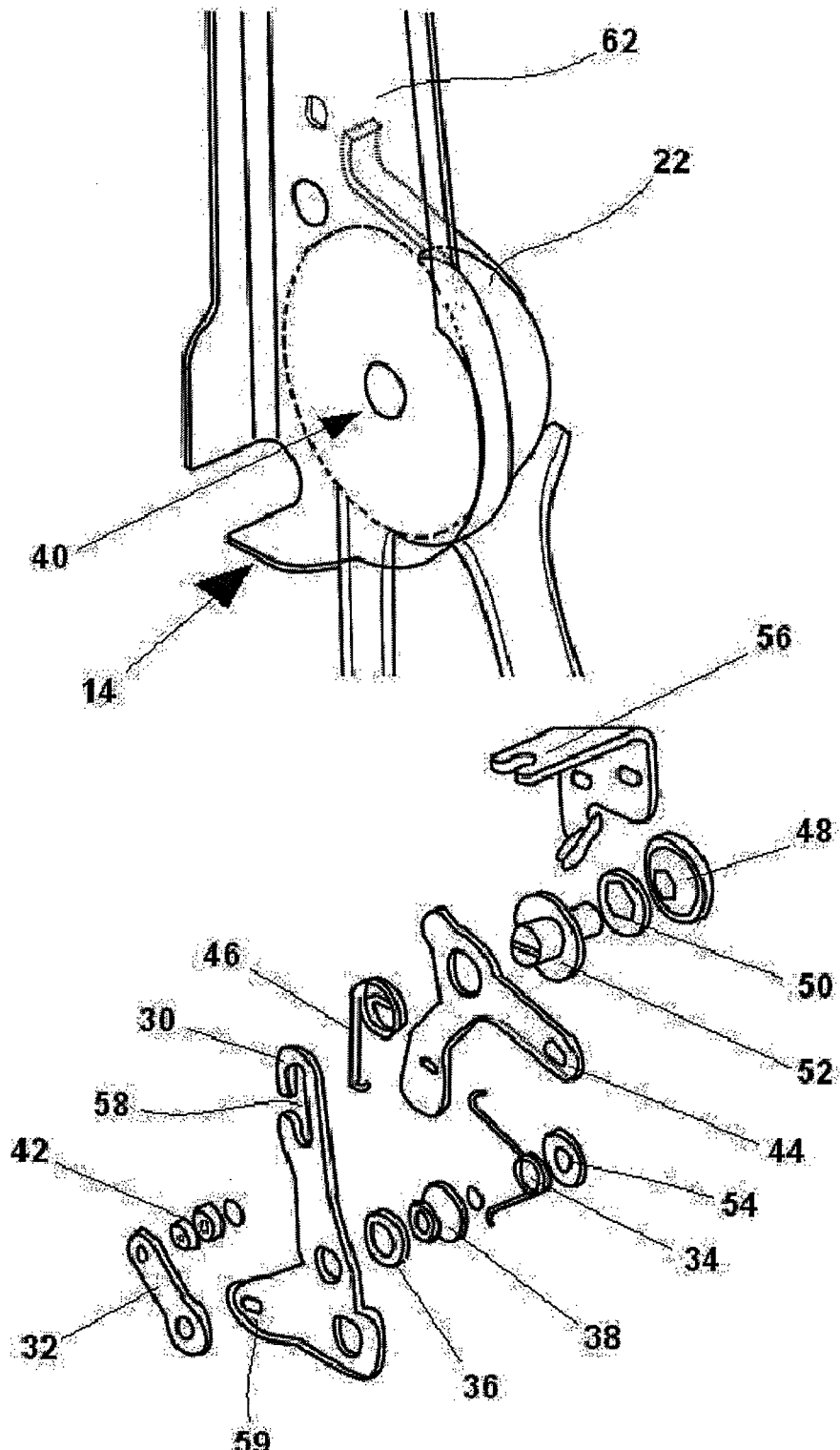
FIG. 3 is an exploded perspective view of a recliner mechanism assembly, according to an exemplary embodiment.

Referring now to FIG. 3, a recliner mechanism 22 that may be used for various seating assemblies is shown. According to an exemplary embodiment, the recliner mechanism 22 may be used for a seat 12 that rotates from a design (use) position into a stowed position such as in a storage space (tub) 24 in the vehicle interior 26. The recliner mechanism 22 includes a bypass reset recliner adjuster or release 28 that enables a single action release and stow adjustment operation of the vehicle seat 12 as explained in more detail below. The recliner mechanism 22 further includes a recliner release crank or member 30, a spring-loaded catch lever (lever by-pass crank) or member 32, a catch lever spring or biasing member 34, a catch lever bushing 36, a spring-loaded (or biased) lever by-pass crank pivot 38, a spring-loaded (or biased) recliner pivot 40, a pin catch lever 42, a cam bracket (by-pass cam) 44, a cam bracket spring (or bias member) 46, a cam bracket spacer 48, a cam bracket bushing 50, a spring-loaded (or biased) by-pass cam pivot 52, a retaining ring or member 54, and a cam stop or member 56.

The recliner release crank or member 30 is pivotably coupled to a seat component (e.g., seat back side member, etc.) and includes a first end and a second end. The first end includes a substantially C-shaped hook for coupling to an actuating member (e.g., strap, cable, etc.). The second end includes an aperture for coupling to actuating member (e.g., cable, etc.). The recliner release crank or member 30 also includes a front and rear attachment area 58, 59 for attaching an actuation means 60 (e.g., cable, strap, etc.) thereon.

The spring-loaded catch lever (lever by-pass crank) or member 32 is pivotably coupled to the seat component (e.g., seat back side member, etc.) and the recliner release crank or member 30 via a lever-bypass crank pivot 38. The catch lever 32 includes a first end and a second end. The first end of the catch lever 32 includes a pin catch lever member 42 extending from the first end for engagement with the cam bracket 44 and the recliner release crank 30.

The cam bracket 44 is pivotably coupled to the seat component (e.g., seat back side member, etc.) via the cam pivot member 52 and includes a first end, a second end, and an extending member. The first end of the cam bracket 44 includes an aperture for coupling to an actuating member (e.g., cable, etc.). The second end of the cam bracket 44 is operable to engage the pin catch lever 42 of the catch lever 32. The extending member of the cam bracket 44 is operable to engage the cam stop 56 to prevent the cam bracket 44 from rotating in the clockwise direction past a predetermined position.

Although a spring is used as a biasing member (or biasing means) for certain components (e.g., catch lever 32, lever by-pass crank pivot 34, recliner pivot 40, cam bracket 44, by-pass cam pivot 38, etc.), other suitable biasing members (e.g., spring pack, elastic member, etc.) may be used as appropriate.

Figure 4:
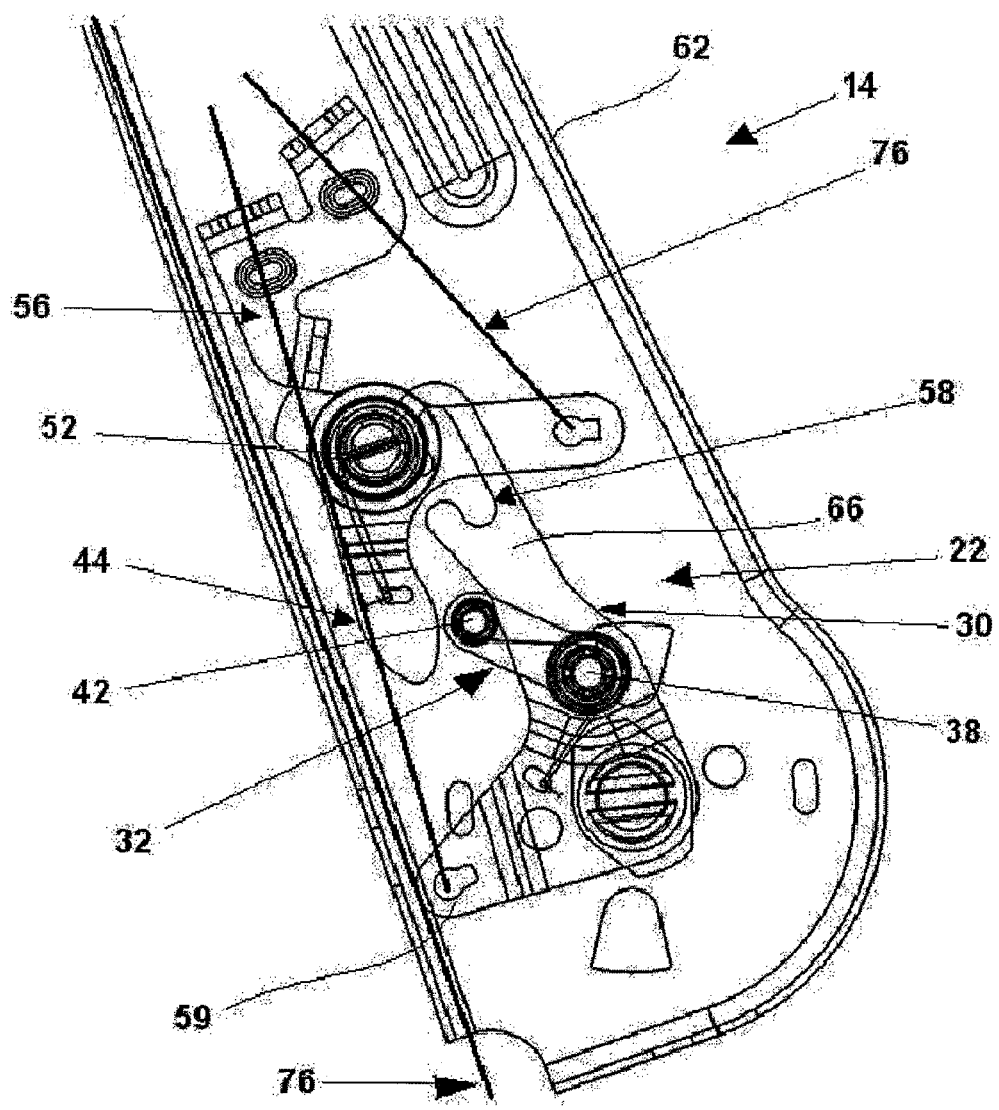
FIG. 4 is a side view of the recliner mechanism of FIG. 3 assembled in a seat frame side member, according to an exemplary embodiment.

As shown in detail in FIG. 4, the recliner mechanism actuator 22 is coupled to the vehicle seat assembly 12 as part of seat frame side member 62 of the seat back 14 but may alternatively be otherwise connected to the vehicle seat 12. The recliner mechanism actuator (front release) 22 may also be operated by pulling an adjuster, strap, or handle member or lever 64 (not shown in FIG. 4) which would be connected to operate the lower (second) end 59 of the crank member 30 to rotate it and thereby release (unlock, unlatch, etc.) the recliner mechanism 22 and to operate the recliner pivot 40. The second adjuster or handle member 65 is coupled to release (un-lock, unlatch, etc.) seat floor latches 68 (shown schematically in FIGS. 5A-6G at the lower end 72 of the front leg supports 70 of the vehicle seat 12) in the vehicle seat 12 to release (unlock, unlatch, etc.) it from strikers 74 (not shown) coupled to the vehicle 10 (e.g., vehicle floor or body-in-white, etc.). The vehicle seat 12 may then be adjusted (rotated, pivoted, articulated, folded, etc.) rearward which action causes the release of the recliner mechanism 22 and thereby enable the seat back 14 to fold forward against the seat cushion 16 and be re-latched for the stowed condition and for the return of the vehicle seat 12 to the design (use/seating) position. The recliner mechanism actuator 22 allows for a single handle actuation and operation to stow the vehicle seat 12 as more fully described below rather than necessitating multiple, confusing operations/motions to stow the vehicle seat 12 into the tub 24.

Figure 5A:
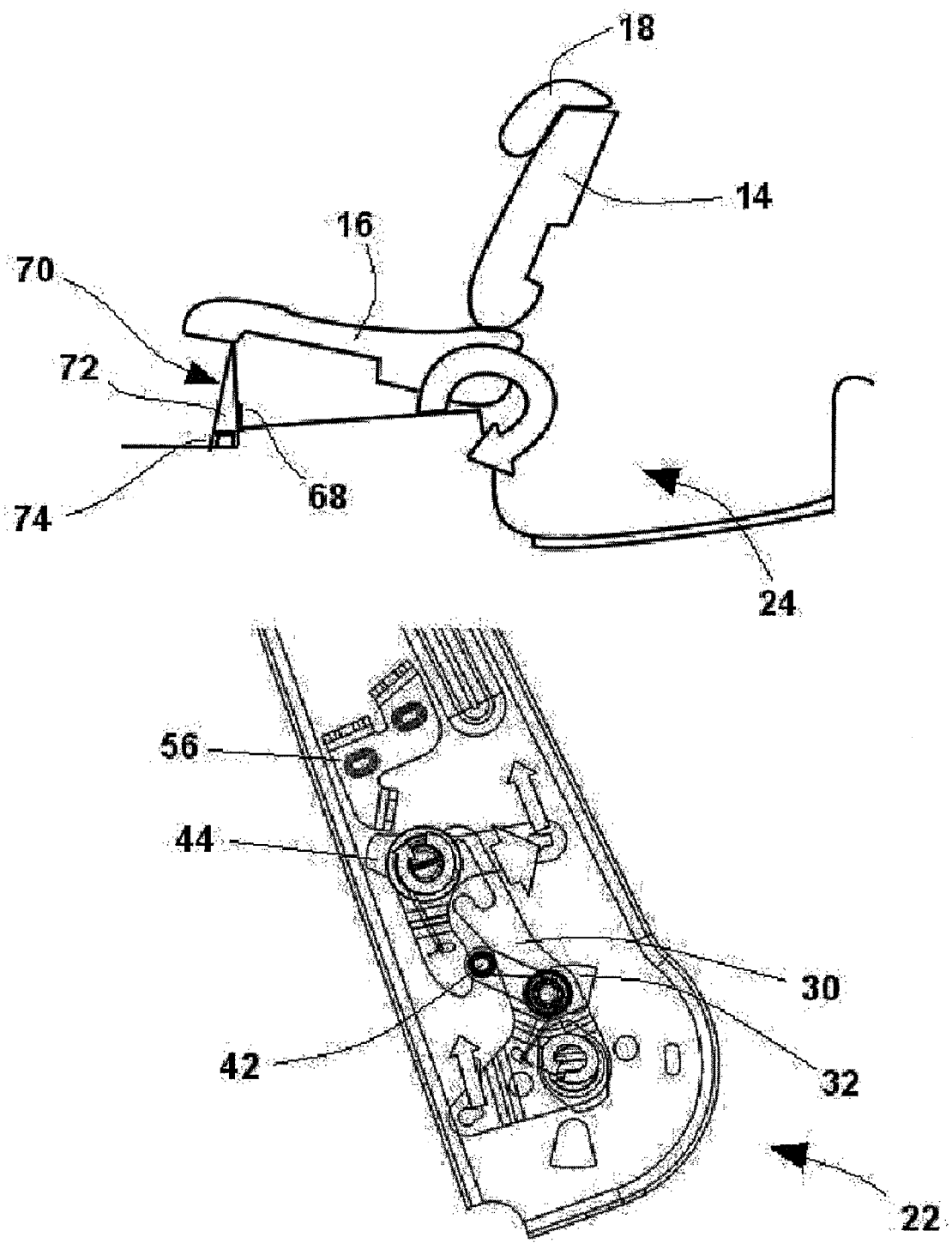
FIGS. 5A through 5F are a progression of side views of the recliner mechanism of FIG. 3 and a vehicle seat in a plurality of positions including a design position, intermediate positions, a stow position, a further intermediate position, and a folded position according to an exemplary embodiment.
Figure 5B:
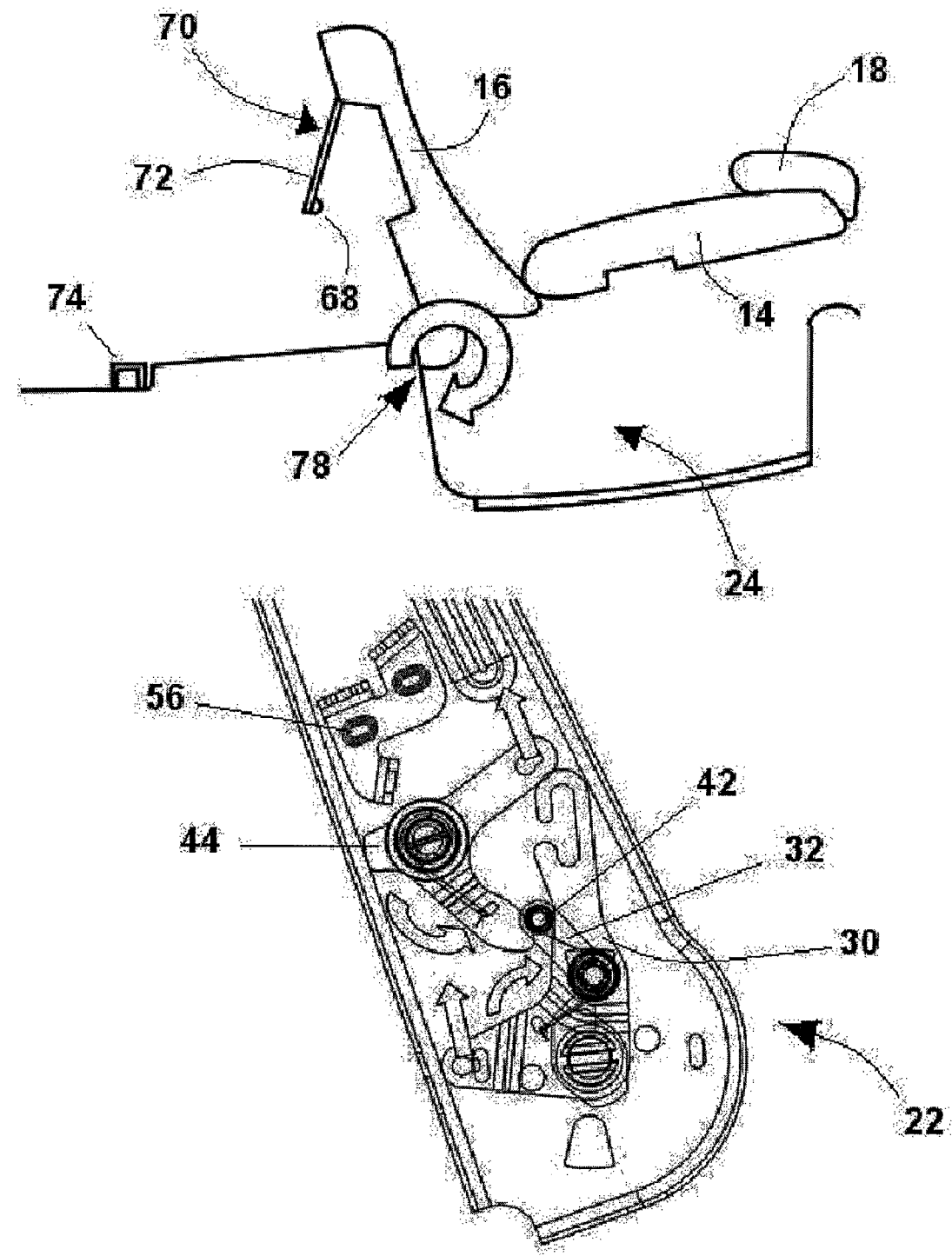
Figure 5C:
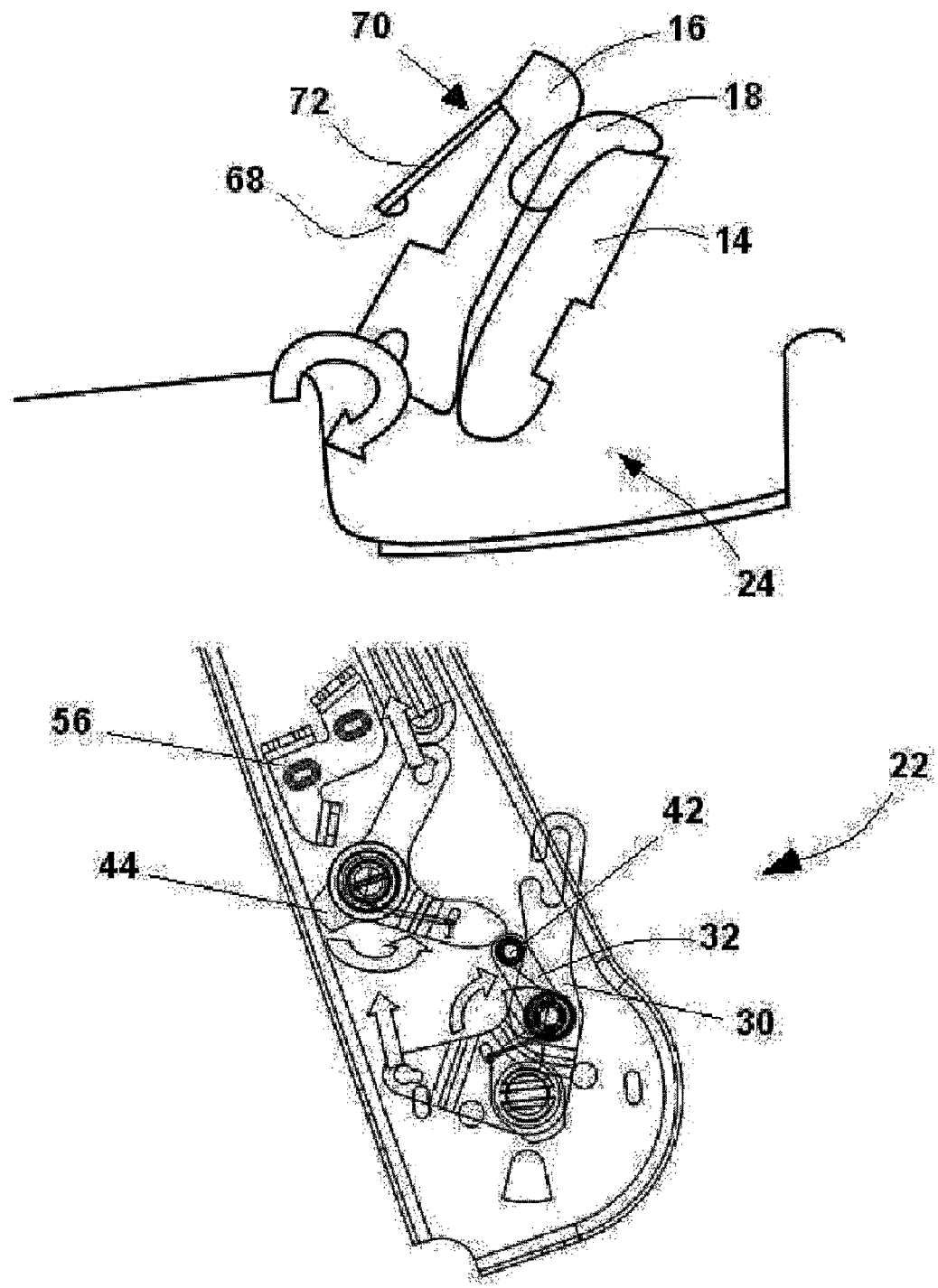
Figure 5D:
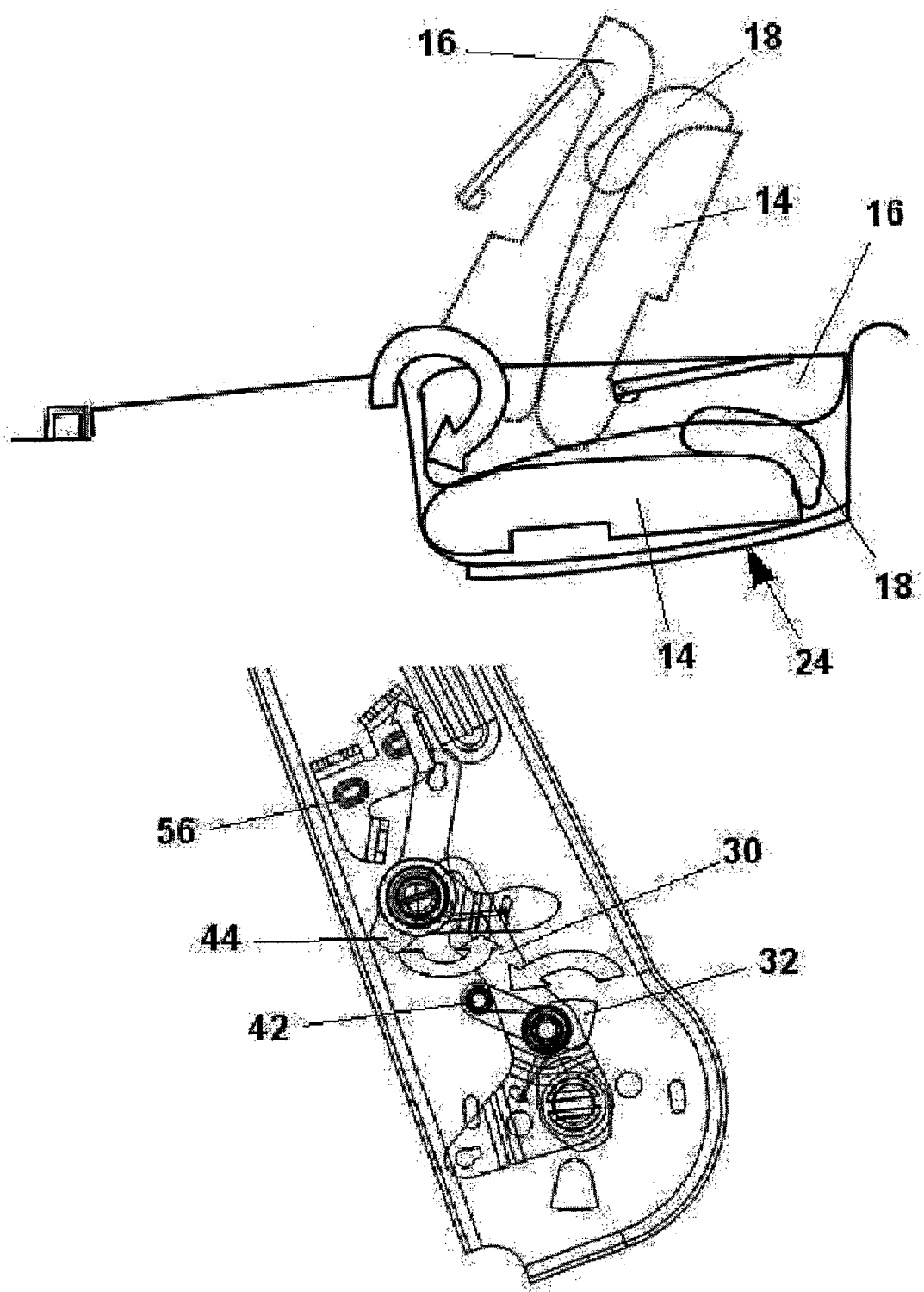
Figure 5E:
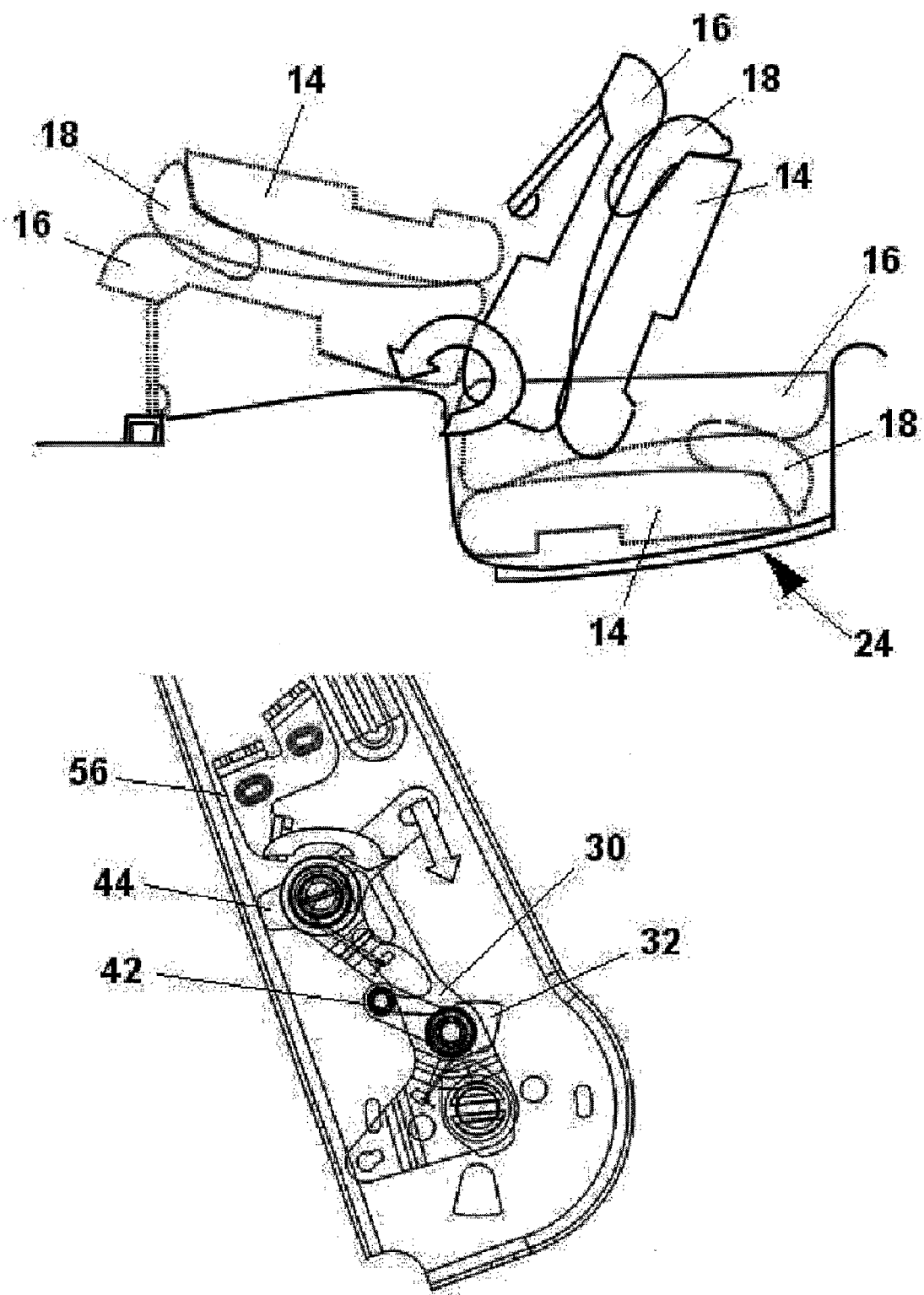
Figure 5F:
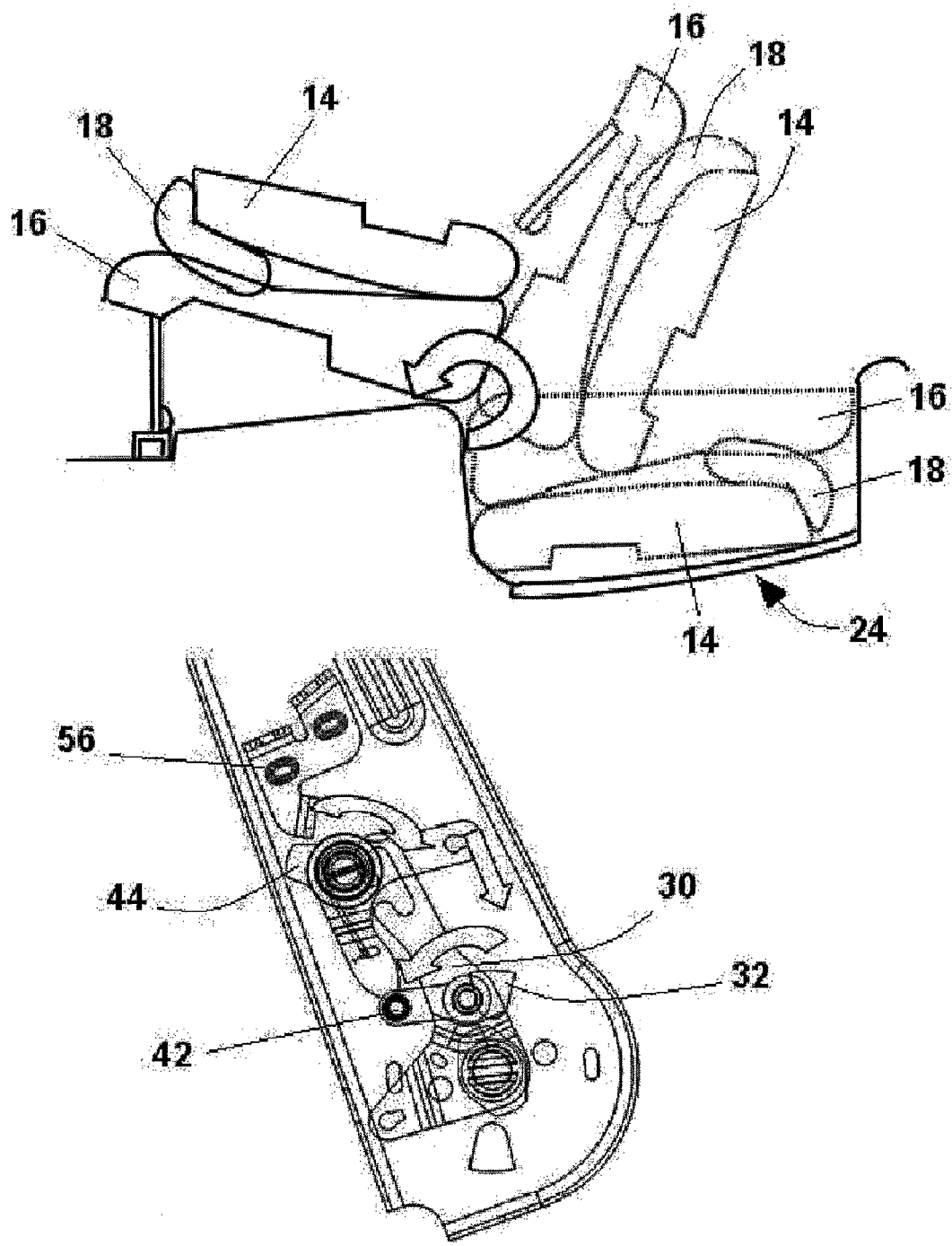
Figure 7A:
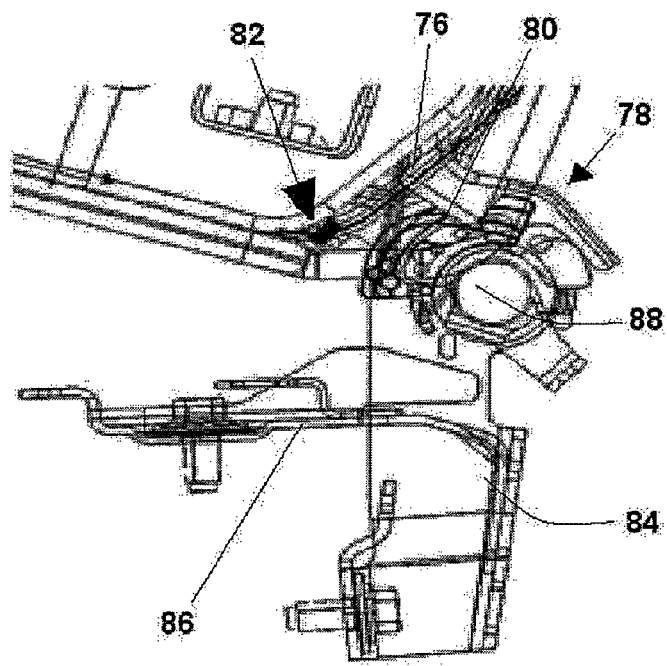
FIGS. 7A through 7C are a progression of side views of the cushion pivot bracket for the vehicle seat assembly in a plurality of positions including a design position, an intermediate position, and a stow position, according to an exemplary embodiment.

Referring now to FIGS. 5A through 5F, the recliner mechanism actuator 22 is shown in various positions transitioning from a design or use position (FIG. 5A) to a stowed or tub position (as shown as the lower seat located in the storage area (tub) 24 in FIG. 5D) and transitioning partially back toward the design/use position (FIGS. 5E-5F) is shown. To transition from the design position to the stow position, the vehicle seat must be released from the vehicle floor by pulling the actuator 64 (e.g., handle, cable, strap, etc.) which may be located in any logical or appropriate location on the seat 12 (e.g., seat back 14, etc.) and thereby unlatching the front leg latches 68 from the strikers 74 coupled to the vehicle 10 (e.g., vehicle floor, etc.), as best shown in FIG. 5A. The cam bracket 44 is biased (spring loaded) toward and against the cam stop 56 and is actuated by a cable member 76. The cable member 76 has one end coupled to the cam bracket 44 (as best shown in FIG. 5B) and its other end coupled and anchored to the cushion pivot bracket 78 (as best shown in FIG. 7A). The rotation of the vehicle seat 12 at the cushion pivot bracket 78 causes the cable 76 to wind about the cam 80 of the cushion pivot bracket 78 such that the one end of the cable 76 pulls on and actuates the cam bracket 44 causing it to rotate until it is against the pin catch lever 42 (FIG. 5B) which, in turn, rotates the catch lever 32 to contact the recliner release crank member 30 and thereby releases the recliner mechanism 22 to unlock the seat back 14 (FIG. 5C) with respect to the seat cushion 16 allowing the seat back 14 to close against the seat cushion 16 as the seat 12 is rotated toward the stow position (FIG. 5D). During actuation of the cam bracket 44, the cam bracket 44 rotates past the pin catch lever 42 (FIG. 5C) and thereby enables the recliner release crank 30 (which is biased toward the latched position, such as by being spring loaded) to return to the latched position, as shown in FIG. 5D. Returning the seat back 14 toward the seating position from the stow position, allows the cable 76 to unwind from the cam 80 of the cushion pivot bracket 78 and enables the cam bracket 44 to rotate back toward its starting position, as shown in FIG. 5E. As the cam bracket 44 rotates back to its starting position, the cam bracket 44 contacts the pin catch lever 42 of the catch lever 32. The catch lever 32 moves clear of the cam bracket 44, and separate from the recliner release crank member 30 and thereby enables the cam bracket 44 to return to its starting position, as shown in FIG. 5F. The catch lever 32 and pin catch lever 42 (which is also biased toward the direction of contacting the recliner release crank member 30, such as by being spring loaded) return back to their starting position and the recliner mechanism 22 is reset and ready for actuation again, as shown in FIG. 5A. At this point, the recliner release crank member 30 is actuated to unlatch the recliner mechanism 22 and allow the seat back 14 to pivot to the design position where the recliner mechanism 22 will latch and lock the seat back 14 in the design position, as shown in FIG. 5A.

Figure 6A:
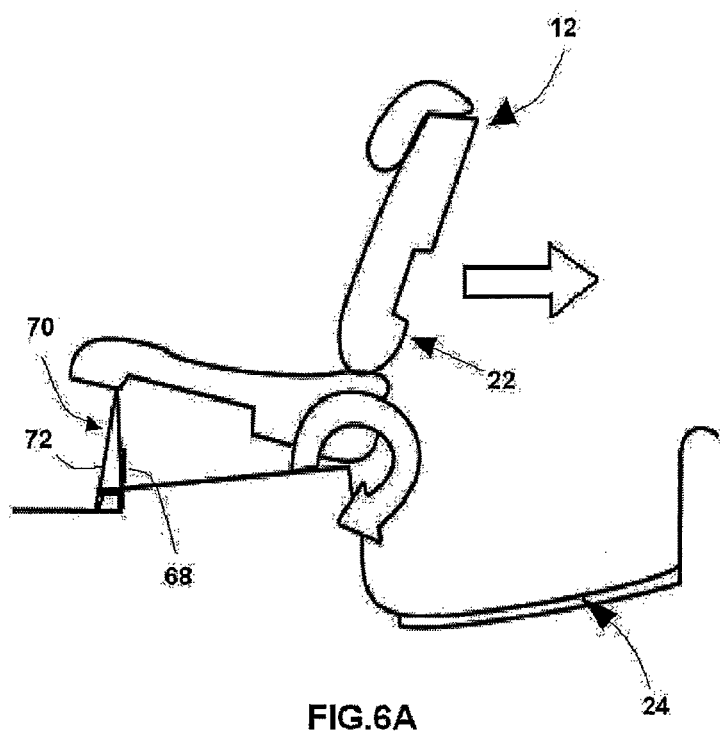
FIGS. 6A through 6G are an alternate progression of side views of a vehicle seat including the recliner mechanism of FIG. 3 transitioning between a design position and stowed position and back, according to an exemplary embodiment.
Figure 6B:
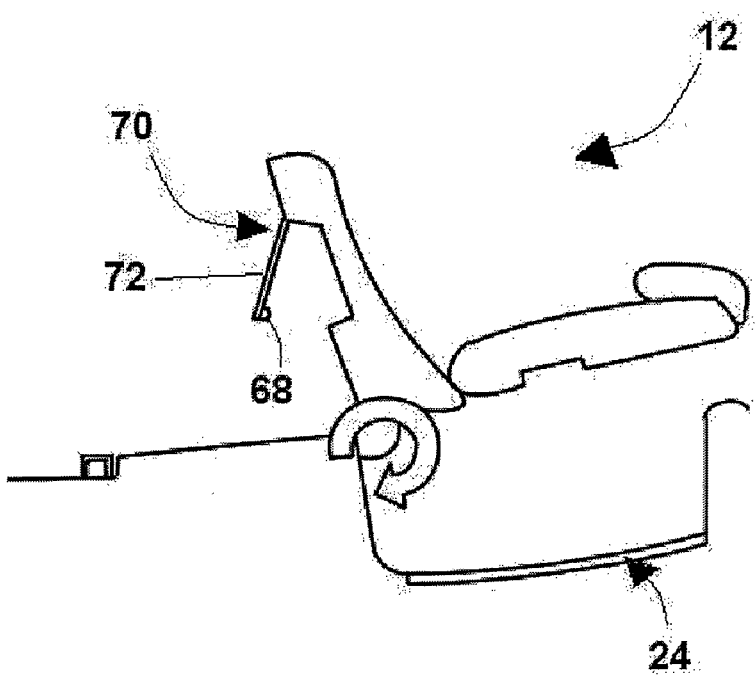
Figure 6C:
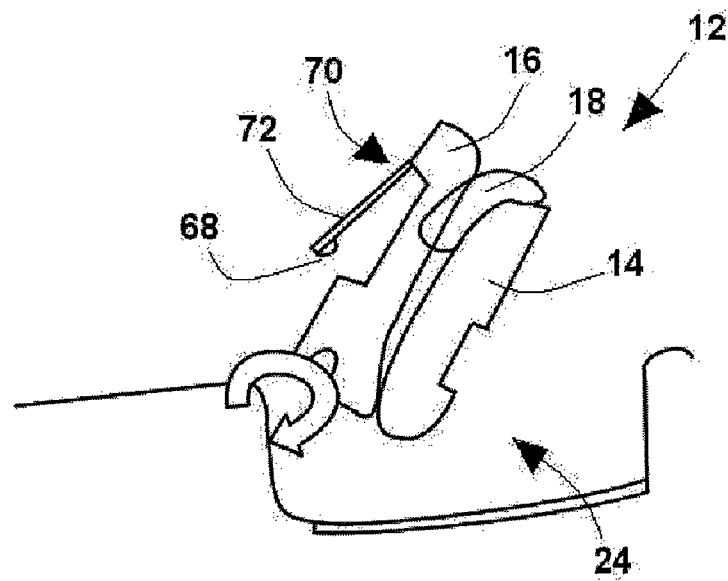
Figure 6D:
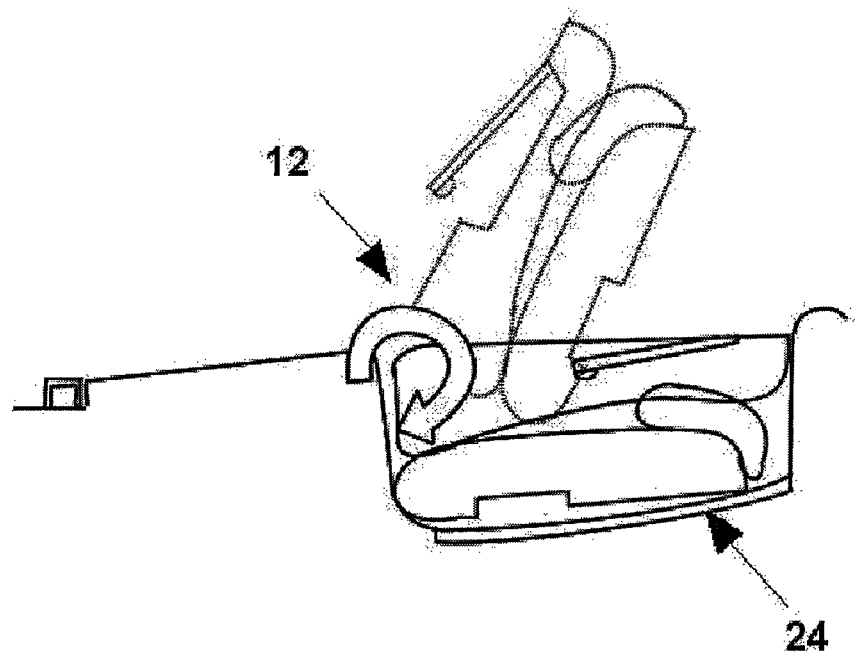
Figure 6E:
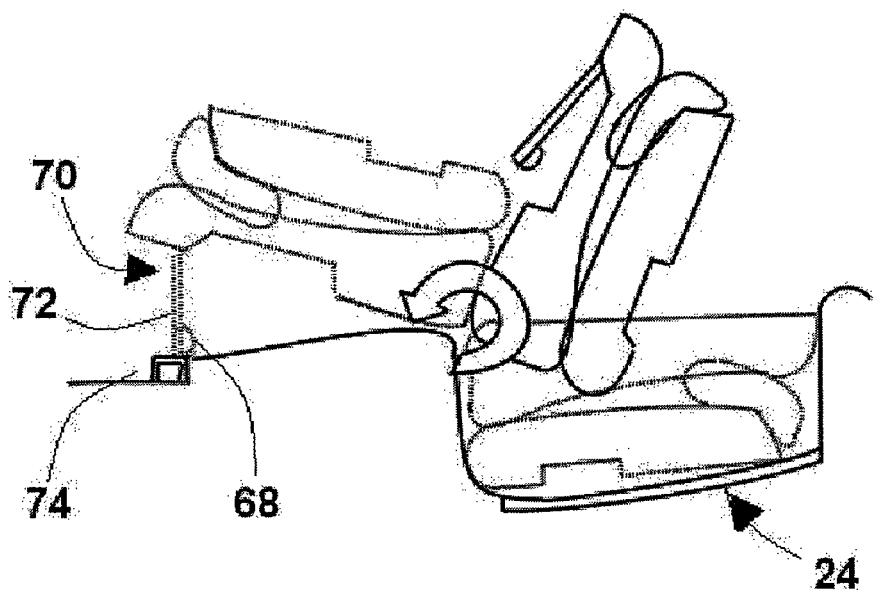
Figure 6F:
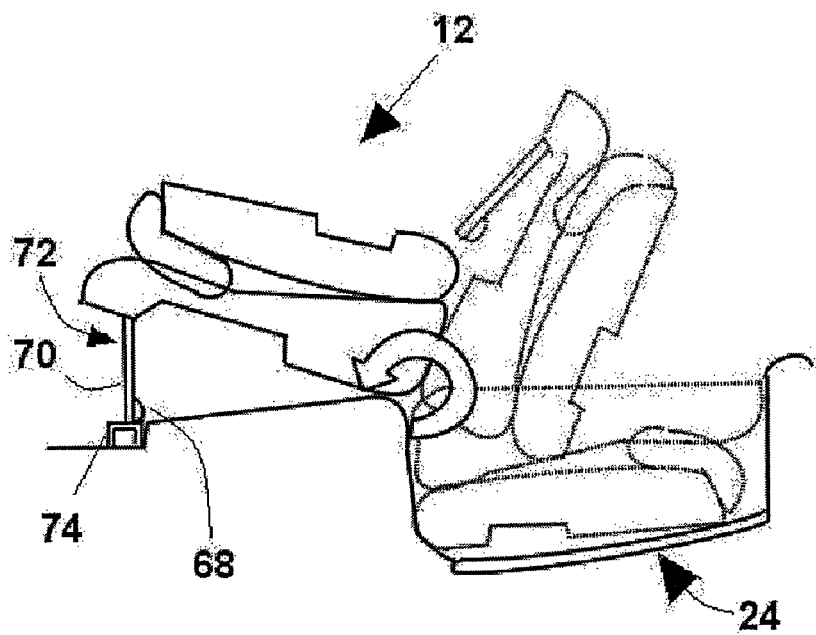
Figure 6G:
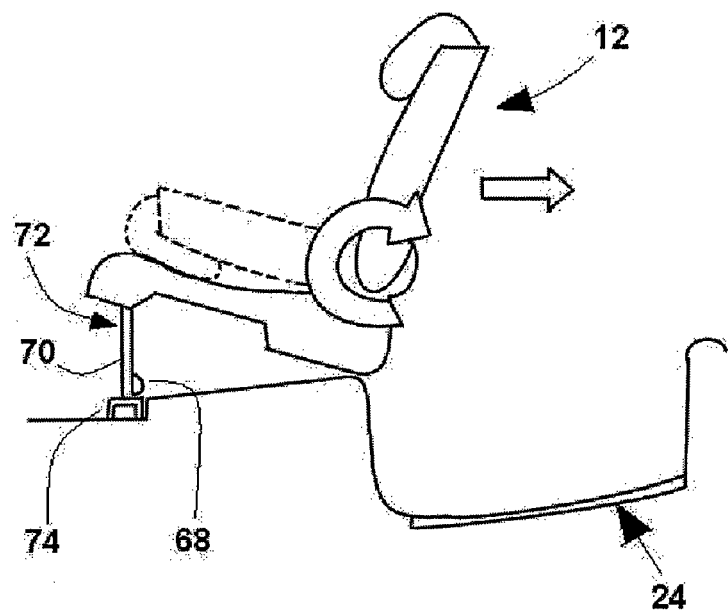

FIGS. 6A through 6G show a vehicle seat 12 including a recliner mechanism 22 transitioning between a design position and stowed position. As shown in FIG. 6A, the floor latch 68 is released, thereby enabling the vehicle seat 12 to begin rotating rearward. Next, the seat 12 is rotated further rearward to release the recliner 22, as shown in FIG. 6B. The vehicle seat 12 continues to rotate toward the stow position to be located in the bin 24 in the floor of the vehicle 10 and once there the recliner mechanism 22 resets and locks, as shown in FIG. 6C and FIG. 6D. To return the vehicle seat 12 to the design or use position, the seat 12 is rotated from the stow position into the vehicle cargo area while the recliner mechanism 22 initially remains locked, as shown in FIG. 6E. Once the vehicle seat 12 is then completely rotated into the vehicle interior while the recliner mechanism 22 remains locked, as shown in FIG. 6F. Next, the recliner mechanism 22 is released by pulling a second actuator (rear release) (e.g., handle, cable, strap, etc.) located on the vehicle seat 12 (e.g., seat back 14, etc.) and the seat back 14 is rotated to the design position, as shown in FIG. 6G. The latches 68 on the front legs 70 of the seat 12 are re-latched to the strikers 74 attached to the vehicle (e.g., vehicle floor), thereby locking the seat 12 to the vehicle 10 in any of the positions shown in FIGS. 6E through 6G.

Figure 7B:
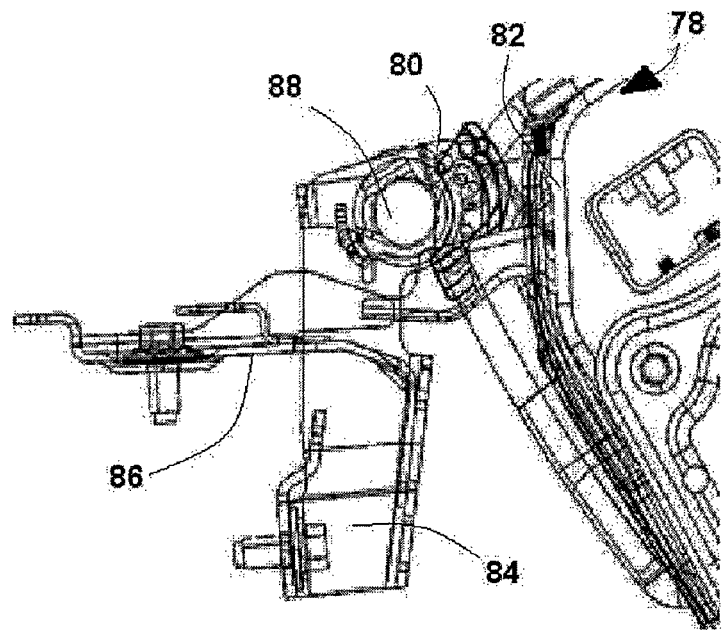
Figure 7C:
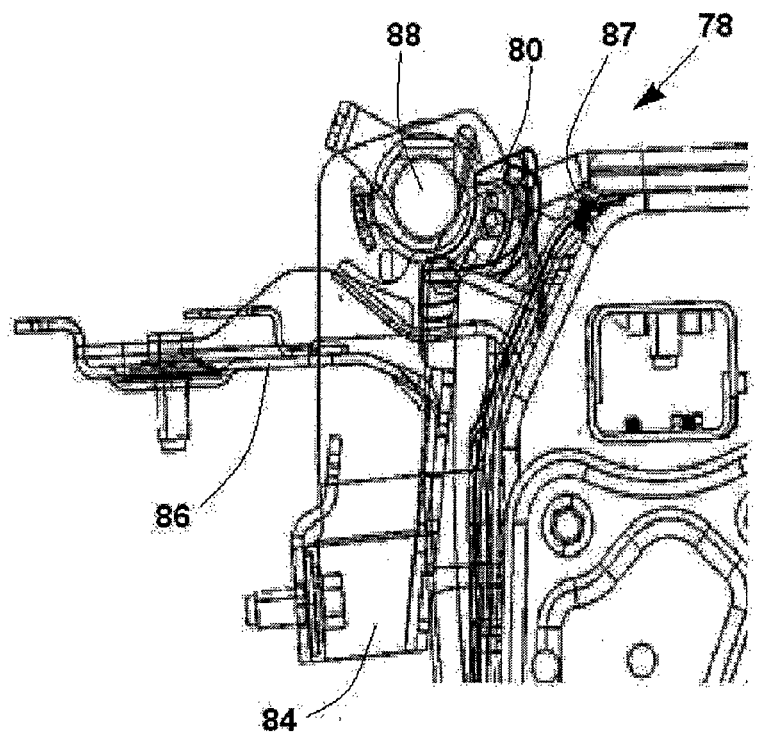

Referring now to FIGS. 7A through 7C, a cushion pivot bracket 78 for a vehicle seat assembly 12 is shown. The cushion pivot bracket 78 includes, among other components, an upper bracket 82, a lower bracket 84, a lower bracket horizontal attachment member 86, a pivot pin 88, a cam 80, and the cam bracket cable 76. The first end of the upper bracket 82 and the first end of the lower bracket 84 are pivotably coupled together via a pivot pin 88. The second end of the upper bracket 82 is coupled to the vehicle seat assembly 12 (e.g., vehicle seat base 20, seat cushion 16, etc.) and the second end of the lower bracket 84 is coupled to the vehicle 10 (e.g., vehicle floor, etc.). The lower bracket horizontal attachment member 86 is coupled to the horizontal surface of the vehicle 10 (e.g., vehicle floor, etc.). The coupling of the upper bracket 82 and the lower bracket 84 via the pivot pin 88 provides for the selective articulation of the vehicle seat assembly 12 such that the vehicle seat assembly 12 may be adjusted (e.g., rotated, pivoted, etc.) between the design/use position and the stowed position. The cam member cable 76 is coupled at one end to the cam 80 of the cushion pivot bracket 78 (shown in FIG. 7A) and coupled at its second end to the cam bracket 44 of the recliner adjuster mechanism 22 (shown in FIG. 4). As noted above, as the vehicle seat assembly 12 is transitioned from the design/use position to the stowed position, the cable 76 winds about the cam 80 of the cushion pivot bracket 76, as best shown in FIGS. 7A through 7C.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A recliner mechanism for use in a seat assembly of a vehicle, the recliner mechanism comprising:

a cam bracket pivotably coupled to the seat assembly, the cam bracket having a first end, a second end, and a biasing member, wherein the biasing member prevents the cam bracket from rotating beyond a predetermined position;

a catch lever having a first end and a second end, the catch lever having a pin catch lever member in operable engagement with the second end of the cam bracket;

a release crank member pivotably coupled directly to a seat back of the seat assembly and directly to the second end of the catch lever, the release crank member having a first end coupled to an actuating member and a second end and the release crank member operable to release the recliner mechanism; and a cable member having one end coupled to the first end of the cam bracket, wherein rotational movement of the seat assembly from a first in-use position to a second stowed position pulls the cable member thereby releasing the recliner mechanism by actuating the cam bracket to rotate and engage a pin catch lever, which rotates the catch lever to contact the release crank member and release the recliner mechanism to unlock a seat back from a seat cushion and move the seat from the first position to the second position.

2. The recliner mechanism of claim 1, further comprising a cushion pivot bracket including a cam, an upper bracket having a first and second end and a lower bracket having a first and second end, wherein the first end of the upper bracket is pivotably coupled to the first end of the lower bracket, the second end of the upper bracket is coupled to the seat assembly, and the second end of the lower bracket is coupled to the vehicle, wherein the cable member has a first end and a second end, the first end is coupled to the cam bracket and the second end is coupled to the cushion pivot bracket.

3. The recliner mechanism of claim 2, wherein rotation of the seat assembly via the cushion pivot bracket causes the cable to wind about the cam of the cushion pivot bracket such that the first end of the cable member actuates the cam bracket causing the cam bracket to rotate against the pin catch lever causing the catch lever to actuate the release crank member to release the recliner mechanism and thereby enable reconfiguration of the seat assembly from the first use position to a second stowed position.

4. The recliner mechanism of claim 1, further comprising a recliner mechanism actuator coupled to the release crank member, the recliner mechanism actuator operable to release the release crank member to thereby release the recliner mechanism.

5. The recliner mechanism of claim 4, wherein the recliner mechanism actuator is also coupled to a seat floor latch and operable to release the seat floor latch when actuated to thereby release the seat assembly.

6. The recliner mechanism of claim 5, wherein the seat floor latch is coupled to the seat assembly and latches onto a striker coupled to the vehicle.

7. A vehicle seat assembly for use in a vehicle, the vehicle seat assembly comprising:
- a seat base pivotably coupled to a seat back frame having a side frame member;
- a recliner mechanism having a cam stop member coupled to the side frame member;
- a cam bracket pivotably coupled to the side frame member, the cam bracket having a first end, a second end, and an extending member, wherein the cam bracket is biased toward the cam stop member such that the extending member engages the cam stop member to prevent the cam bracket from rotating beyond a predetermined position;
- a catch lever having a first end and a second end, the catch lever having a pin catch lever member in operable engagement with the second end of the cam bracket;
- a release crank member pivotally coupled directly to the seat back frame and coupled directly to the catch lever, the release crank member having a first end coupled to an actuating member and a second end and the release crank member operable to release the recliner mechanism;
- a cushion pivot bracket including a cam, an upper bracket having a first and second end and a lower bracket having a first and second end, wherein the first end of the upper bracket is pivotably coupled to the first end of the lower bracket, the second end of the upper bracket is coupled to the seat base, and the second end of the lower bracket is coupled to the vehicle;
- a cable member having a first end and a second end, wherein the first end is coupled to the first end of the cam bracket and the second end coupled to the cushion pivot bracket and rotation of the seat base via the cushion pivot bracket causes the cable to wind about the cam of the cushion pivot bracket such that the first end of the cable member actuates the cam bracket causing the cam bracket to rotate against the pin catch lever causing the catch lever to actuate the release crank member which releases the recliner mechanism and thereby enables reconfiguration of the vehicle seat assembly from a first use position to a second stowed position.

8. The vehicle seat assembly of claim 7, wherein the recliner mechanism further comprises a recliner mechanism actuator that enables a single handle actuator to release the recliner mechanism and seat assembly to thereby enable reconfiguration of the seat assembly from the first use position to the second stowed position.

9. The vehicle seat assembly of claim 8, wherein the recliner mechanism actuator is coupled to the first end of the release crank member and is operable to rotate the release crank member when actuated to thereby release the recliner mechanism.

\* \* \* \* \*